United States Patent [19]

Terada et al.

[11] Patent Number: 4,884,192

[45] Date of Patent: Nov. 28, 1989

[54] INFORMATION PROCESSOR CAPABLE OF DATA TRANSFER AMONG PLURAL DIGITAL DATA PROCESSING UNITS BY USING AN ACTIVE TRANSMISSION LINE HAVING LOCALLY CONTROLLED STORAGE OF DATA

[75] Inventors: Hiroaki Terada, Suita; Katsuhiko Asada, Amagasaki; Hiroaki Nishikawa, Suita; Souichi Miyata, Shiki; Hajime Asano, Toyonaka; Masahisa Shimizu, Kadoma; Kenji Shima, Nishinomiya; Shinji Komori, Itami, all of Japan

[73] Assignees: Sharp Kabushiki Kaisha, Osaka; Matsushita Electric Industrial Co., Ltd., Kadoma; Sanyo Electric Co., Ltd., Moriguchi; Mitsubishi Denki Kabushiki Kaisha, Tokyo, all of Japan

[21] Appl. No.: 134,601

[22] Filed: Dec. 14, 1987

Related U.S. Application Data

[63] Continuation of Ser. No. 765,504, Aug. 14, 1985, abandoned.

[30] Foreign Application Priority Data

Aug. 16, 1984 [JP] Japan .................. 59-171121
Aug. 16, 1984 [JP] Japan .................. 59-171203

[51] Int. Cl.⁴ .............................................. G06F 13/40
[52] U.S. Cl. .................................. 364/200; 370/85.15
[58] Field of Search .............. 370/88, 89, 41, 75, 370/86, 91; 364/200, 900; 340/825.05; 377/129

[56] References Cited

U.S. PATENT DOCUMENTS

| | | | |
|---|---|---|---|
| 3,219,980 | 11/1965 | Griffith et al. | 364/200 |
| 3,787,627 | 1/1974 | Abramson et al. | 370/92 X |
| 3,999,163 | 12/1976 | Levy et al. | 364/200 |
| 4,002,842 | 1/1977 | Meyr et al. | 370/86 |
| 4,205,326 | 5/1980 | Porter et al. | 375/3 |
| 4,334,305 | 6/1982 | Girardi | 364/200 X |
| 4,432,054 | 2/1984 | Orada et al. | 364/200 |
| 4,455,608 | 6/1984 | Suzuki et al. | 364/200 |
| 4,468,734 | 8/1984 | Lanier et al. | 364/200 |
| 4,470,114 | 9/1984 | Gerhold | 364/200 |
| 4,482,996 | 11/1984 | Wilson et al. | 370/60 |
| 4,490,784 | 12/1984 | Ives et al. | 364/200 |
| 4,554,659 | 11/1985 | Blood et al. | 370/86 X |
| 4,561,088 | 12/1985 | Champlin et al. | 370/86 X |
| 4,627,070 | 12/1986 | Champlin et al. | 375/3 |

FOREIGN PATENT DOCUMENTS

| | | |
|---|---|---|
| 0014926 | 9/1980 | European Pat. Off. |
| 0110569 | 6/1984 | European Pat. Off. |
| 0147857 | 7/1985 | European Pat. Off. |

OTHER PUBLICATIONS

Ralston A. and Reilly E. D., "Encyclopedia of Computer Science and Engineering", *Van Nostrand Reinhold Co. Inc.*, 1983, pp. 672-673, 1471-1473.

IBM Technical Disclosure Bulletin, vol. 26, No. 5, Oct. 1983, "Multiplex Interface Control in a Closed-Ring Network", J. R. Volk, pp. 2272-2275.

Proceedings of the First International Conference on Distributed Computing Systems, Oct. 1979, "Architecture Considerations for Local Computer Networks", by Thurber et al., pp. 131-142.

*Primary Examiner*—David L. Clark
*Attorney, Agent, or Firm*—Staas & Halsey

[57] ABSTRACT

In an information processor, input interface units (161, 162) are connected to one ring data bus (191) through jointing units (201, 202) and data processing units (181 and 185) are connected to the ring data bus (191) through jointing units (203 through 206) and branching units (221 through 224). Data processing units (183 through 187) are connected to the other ring data bus (192) through jointing units (207 through 210) and branching units (225 through 228) and output interface units (171, 172) are connected to the other ring data bus (192) through branching units (229, 230). The ring data buses (191, 192) propagate the respective in data through the input interface units (161, 162) while storing such data, and processing the data in any of the data processing units to provide outputs to any of the output interface units (171, 172). Thus, since the data is transmitted through the ring data buses (191, 192) while being held in the data buses, there is no necessity to provide a memory for temporarily storing the data in each data processing unit. In addition, for a large scale integration of a system, it is easy to integrate each unit in a high density.

4 Claims, 12 Drawing Sheets

FIG. 7
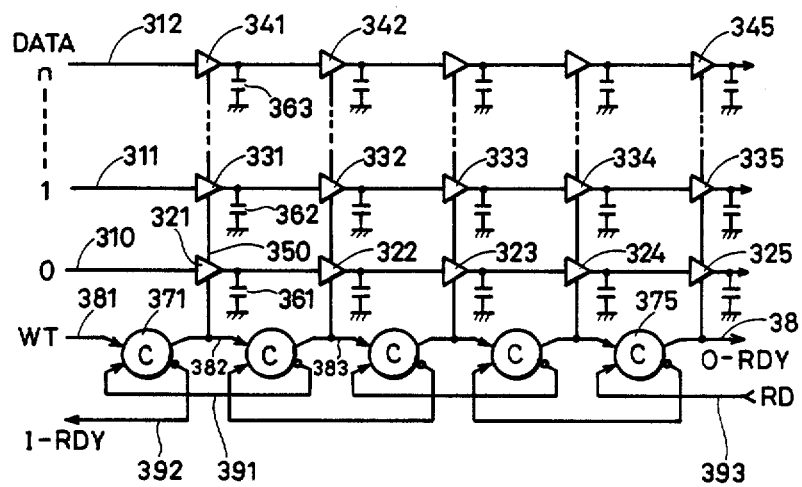
FIG. 8
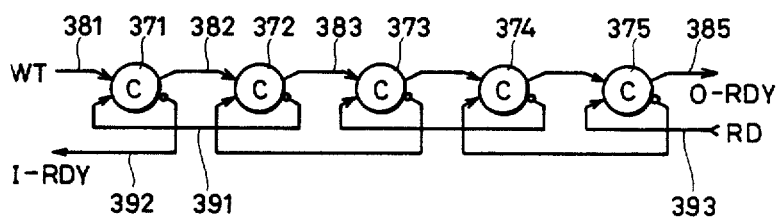
FIG. 9
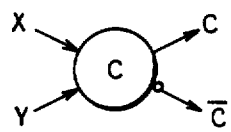
FIG. 10
| X | Y | C | $\overline{C}$ |
|---|---|---|---|
| 0 | 0 | 0 | 1 |
| 0 | 1 | Hold | Hold |
| 1 | 0 | Hold | Hold |
| 1 | 1 | 1 | 0 |

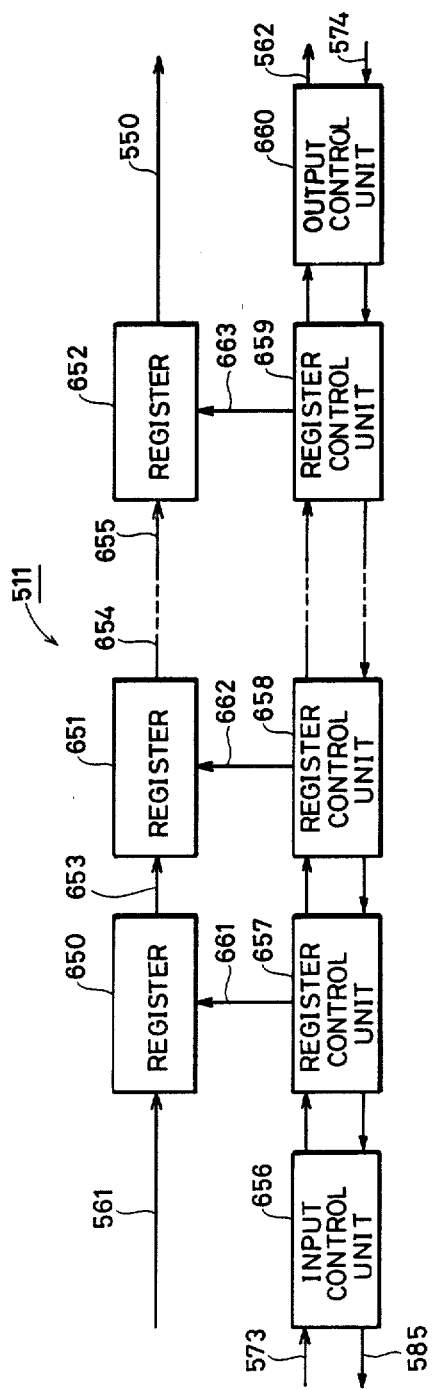
F I G. 16 ized storage of data

This is a continuation of co-pending application Ser. No. 765,504 filed on Aug. 14, 1985, now abandoned.

BACKGROUND OF THE INVENTION

1. Field of the Invention

The present invention relates to an information processor. More particularly, the present invention relates to an information processor using ring data buses for the purpose of communication of data between a plurality of digital data processing units. Description of the Prior Art Recently, attention has been paid to an architecture for a communication path between a plurality of digital data processing units. For example, a multiprocessor system is considered important because of its effectiveness in high speed digital data processing. In such a multiprocessor system, an architecture for a communication path between a plurality of processors becomes extremely significant. As a communication path between various kinds of digital data processing units such as a multiprocessor and peripheral devices, a ring data bus has been utilized.

FIG. 1 is a schematic block diagram showing an information processor using a conventional ring data bus, FIG. 2 is a block diagram showing in detail a input interface unit shown in FIG. 1, and FIG. 3 is a detailed block diagram of an output interface unit shown in FIG. 1.

Referring to FIGS. 1 to 3, an information processor using a conventional ring data bus will be described. Data processing units 1, 2 and 3 are connected to queue memories 10, 11 and 12 through data buses 20 through 22, input ready signal lines 23 through 25 and write signal lines 26 through 28. The queue memories 10, 11 and 12 are connected to input interface units 40, 41 and 42 through data buses 30 through 32, output ready signal lines 33 through 35 and shift signal lines 36 through 38. These input interfaces 40, 41 and 42 are connected in a ring fashion, together with output interfaces 70, 71 and 72. More particularly, the input interfaces 40, 41 and 42 and the output interfaces 70, 71 and 72 are connected, respectively, to data lines 50 through 55, acknowledge signal lines 56 through 61 and output ready signal lines 62 through 67, which are in the ring bus.

The output interfaces 70, 71 and 72 are connected to queue memories 13, 14 and 15 through data buses 80 through 82, input ready signal lines 83 through 85 and write signal lines 86 through 88. These queue memories 13, 14 and 15 are connected to data processing units 4, 5 and 6 through data buses 90 through 92, output ready signal lines 93 through 95 and read signal lines 96 through 98.

In FIG. 1, let us consider the situation where the output data from the particular data processing unit among three data processing unit 1, 2 and 3 should be transmitted to only a desired unit among three data processing units 4, 5 and 6. For example, in case where the data is transmitted from the data processing unit 2 to the data processing unit 4, the data processing unit 2 provides on the data bus 21 the data including data to be outputted and address information corresponding to the data processing unit 4 which is the destination. Then, the data processing unit 2 first confirms that the input ready signal line 24 of the queue memory 11 is a logical "1" and generates a write signal on the write signal line 27 so that the above described data can be stored in the queue memory 11 for the moment. Then, the queue memory 11 makes the output ready signal line 34 be a logical "1".

Incidentally, the logical "1" corresponds to a high level of a signal and the logical "0" corresponds to a low level of a signal.

If and when the input interface 41 verifies that the data field on the data line 51 is the empty slot and that the acknowledge signal line 58 of the ring bus is a logical "0", the above described data is read out of the queue memory 11 into the input interface 41 through the data bus 31 and is applied on the data line 52 of the ring bus. At that time, the input interface 41 simultaneously provides on the data line 52 of the ring bus a control bit indicating that the data on the data line 52 of the ring bus is the filled slot and generates a shift signal on the shift signal line 37 so that the output ready signal line 64 of the ring bus is rendered to be a logical "1".

The input interface 42 examines whether the data field on the data line 52 is an empty slot or not, after identifying that the output ready signal line 64 of the ring bus has changed to a logical "1". If and when the input interface 42 verifies that the data field on the data line 52 is not the empty slot, the interface 42 provides on the data line 53 the data, as it is, so that the acknowledge signal line 58 is rendered to be a logical "1" and the output ready signal line 65 is also rendered to be a logical "1".

After the input interface 72 verified that the output ready signal line 65 became a logical "1", the interface 72 verifies that the data field on the data line 53 is the empty slot and identifies the address information contained in the data. If and when the output interface 72 verifies that the address information does not correspond to the data processing unit 6, the interface 72 provides on the data line 54 the above described data, as it is, so that the acknowledge signal line 59 is rendered to be a logical "1" and the output ready signal line 66 is also rendered to be a logical "1".

An operation of the output interface 71 is the same as that of the above described output interface 72. That is, the data sent from the output interface 72 is applied to the data line 55 so that the acknowledge signal line 60 is rendered to be a logical "1" and the output ready signal line 67 is also rendered to be a logical "1".

When the input interface 70 verifies that the output ready signal line 67 has a logical "1", the interface 70 examines whether the data field applied to the data line 55 is the empty slot and identifies the address information contained in the data. If and when the output interface 70 verifies that the data field applied to the data line 55 is the empty slot and that the address information as identified corresponds to the data processing unit 4, the above described data is applied to the data bus 80 and the acknowledge signal line 61 is rendered to be a logical "1". When the input interface 70 verifies that the input ready signal line 83 is a logical "1", a write signal 86 is generated so that the above described data is written into the queue memory 13. Thereafter, the queue memory 13 renders the output ready signal line 93 to be a logical "1".

The data processing unit 4 generates a read signal on the read signal line 96 to read out the data from the queue memory 13 through the data bus 90, as long as the data processing unit 4 is in an enable state to receive data and the output ready signal 93 is a logical "1". Thus, a series of operations for data transmission is completed.

Now, referring to FIG. 2, the input interfaces 40 through 42 shown in FIG. 1 will be described in detail. The input interface 41 will be explained by way of an example. The input interface 41 comprises a control unit 100, a data switching portion 102, a latch 105, an empty slot verifier 106, and a control bit setter 110. The control unit 100 is responsive to a logical "1" in the output ready signal line 63 to verify that the input interface 40 applies the data to the data line 51. If and when the control unit 100 verifies that the output ready signal line 63 is a logical "1", a switching signal 101 is rendered to be a logical "0" so that the data is bypassed onto the data line 103 by the data switching portion 102.

The control unit 100 generates a latch signal 104 after the control unit 100 confirms that the acknowledge signal line 58 is a logical "0". If and when the control unit 100 generates a latch signal 104, the latch 105 latches the data. At the same time, the control unit 100 makes the acknowledge signal line 57 be a logical "1" and, after a delay time sufficient to fix the data latched in the latch 105 on the data line 52, the output ready signal line 64 is rendered to be a logical "1". The control unit 100 repeats a series of operations as described in the foregoing.

If and when the control unit 100 verifies that the output ready signal line 63 becomes a logical "0", the acknowledge signal line 57 is rendered to be a logical "0" and if and when the acknowledge signal line 58 becomes a logical "1", the output ready signal line 64 is rendered to be a logical "0". However, the control unit 100 operates in a discontinuous manner to perform the above described repeated operation at every pause cycle of the above operations, and performs the next interrupting operation, only in the event that the queue memory 11 outputs new data, that is, only if the queue memory 11 applies the data on the data bus 31 so that the output ready signal 34 is rendered to be a logical "1".

More particularly, after the output ready signal line 63 becomes a logical "1", the empty slot verifier 106 identifies a control bit 107 indicating that there is an empty slot on the data line 51 or not. If and when an empty slot verification result signal 108 is a logical "0", the control unit 100 makes a switching signal 101 a logical "0" in the same manner as the above described repeated operations, until the empty slot verification result signal 108 becomes a logical "1". The control unit 100 makes the data, as it is, on the data line 51 bypassed to the data line 103 and generates a latch signal 104 after confirming that the acknowledge signal line 58 is a logical "0". If and when the latch signal 104 is generated, the latch 105 latches the data. In addition, the control unit 100 makes the acknowledge signal line 57 a logical "1" and after a delay time period sufficient to fix the data latched in the latch 105 on the data line 52, the output ready signal line 64 is rendered to be a logical "1", which operation is repeated.

If and when the above described empty slot verification result signal 108 becomes a logical "1", the control unit 100 makes the switching signal 101 a logical "1" and the control bit setter 110 renders a control bit 109 a logical "0" which indicates that there is an empty slot on the data bus 31, and then the control bit 109 is added to the data. The data including the control bit 109 added thereto is bypassed to the data line 103. Then, the control unit 100 makes the acknowledge signal line 57 a logical "1" and generates a latch signal 104 after confirming that the acknowledge signal line 58 is a logical "0". The latch 105 latches the data in response to the latch signal 104.

The control unit 100 generates a shift signal 37 so that the new data appears on the data bus 31. In addition, after a sufficient delay time period to latch the data in the latch 105 on the data line 52 of the ring bus, the control unit 100 performs an operation for making the output ready signal line 64 a logical "1" and completes the above described interrupt operation. Incidentally, the other input interfaces 40 and 42 operate in the same manner.

Now, referring to FIG. 3, the output interfaces 70 through 72 will be described in detail. Taking the output interface 70 as an example, the output interface 70 comprises a control unit 111, an empty slot verifier 114, an address identifier 115, a data switching portion 119, a control bit setter 120 and a latch 125.

The control unit 111 is responsive to a logical "1" of the output ready signal line 67 to determine that the output interface 71 provides the data on the data line 55. The empty slot verifier 114 examines whether the data field applied to the data line 55 is the empty slot or not and the address identifier 115 identifies address information 113 contained in the data. The control unit 111 makes a switching signal 118 a logical "1", only when the data is a filled slot and address information 113 corresponds to the data processing unit 4, that is, only when the empty slot verification result signal 116 is a logical "0" and the address identifying result signal 117 is a logical "1".

If and when the switching signal 118 becomes a logical "1", the data applied on the data line 55 is bypassed to the data bus 80 as it is, by the data switching portion 119. A control unit 111 generates a write signal 86 to provide a queue memory 13 after the input ready signal line 83 from the queue memory 13 becomes a logical "1". In addition, the control unit 111 makes the acknowledge signal line 61 a logical "1" and provides an addition instruction signal 121 to a control bit setter 120. At that time, the data line 123 is in an open state, since the data switching portion 119 is switched to the queue memory 13.

Then, the control unit 111 verifies that the acknowledge signal line 56 is a logical "0" and renders to be a logical "1" a control bit 123 which indicates that the data field applied on the data line 122 is the empty slot. Then, the control unit 111 generates a latch signal 124 so that the control bit 123, which is rendered to be a logical "1", is latched in the latch 125. In addition, the control unit 111 makes the output ready signal line 62 a logical "1", after a sufficient delay time period to latch the data in the latch 125 on the data line 50 of the ring bus.

If and when the empty slot verification result signal 116 is a logical "1" or the address identification result signal 117 is a logical "0", the control unit 111 makes the switching signal 118 a logical "0" so that the data on the data line 55, as it is, is bypassed onto the data line 122. Then, the control unit 111 generates a latch signal 124 so that the data on the data line 122 is latched in the latch 125, after confirming that the acknowledge signal line 56 is a logical "0". In addition, the control unit 111 renders the acknowledge signal line 61 to be a logical "1" and, after a sufficient delay time period to fix the data latched in the latch 125 on the data line 50, the output ready signal line 62 is rendered to be a logical "1". The control unit 111 renders the acknowledge signal line to be a logical "0" at the time when the output ready signal line 67 of the ring bus becomes a logical "0". In addition, the control unit 111 renders the output ready signal line 62 to be a logical "0" at the time when the acknowledge signal line 56 becomes a logical "1". Other output interfaces 71 and 72 perform the same operation as that in the above described output interface 70.

As described in the foregoing the information processor as shown in FIG. 1 requires separate queue memories 10, 11, 12, 13, 14 and 15, respectively, for all of the input interfaces 40, 41, 42 and all of the output interfaces 70, 71, 72. For this reason, in the event that an amount of each data flowing into the ring buses sharply varies, that is, for example, in the event that a large amount of data is outputted only from the data processing unit 1 at a certain timing point and another large amount of data is outputted only from the data processing unit 3 at another timing point, the capacities of all of the queue memories 10 through 15 should be determined such that all of the queue memories 10 through 15 never cause overflow.

In other words, each of the queue memories 10 through 15 should have an extremely large memory capacity so that each of the queue memories 10 through 15 cannot overflow. For this reason, it is not suitable for making an information processor small-sized.

In addition, it is rare that all of the queue memories 10 through 15 are almost occupied and hence a use efficiency for using the queue memories 10 through 15 as a whole is extremely low Furthermore, there is a disadvantage that a structure becomes complicated because control bits 107 and 112 indicating that the data field on the ring bus is the empty slot should be additionally required. More particularly, applying on the ring bus the data which is read out from the queue memories 10 through 15 to each of the input interfaces 40 through 42 requires a mechanism for resetting the above described control bit, that is, a control bit setter 110. In addition, a mechanism for monitoring said control bit on the data line of the ring bus on an input side, that is, an empty slot verifier 106 is required. Furthermore, a mechanism for monitoring said control bit on the data line on the input side, that is, the empty slot verifier 114 is also required in each of the output interfaces 70 through 72. Another mechanism for rendering to be logical "1" said control bit on the data line on the output side when the data on the ring bus on the input side is applied to the queue memories 10 through 15, the control bit setter 120 is also required. Further, as shown in FIGS. 2 and 3, the latches 105 and 125 are required in each interface. In these circumstances, the structure of each of the interfaces 40 through 42 and 70 through 72 becomes extremely complicated, which is a significant disadvantage.

On the other hand, with the recent advancement of semiconductor manufacturing techniques, many functional blocks are integrated in a semiconductor device with high density. In this case, because of a requirement for fast signal communication, functional coupling is made between functional blocks in a semiconductor integrated circuit device by using a metal wiring or metal silicide wiring or the like as data lines and control lines. However, with multiplication of function required for device, a proportion of occupation of said wiring regions in the device, particularly, address lines or data lines or control lines progressively increases. In addition, as described in the foregoing, in order to execute processing, such as fast data communication to an external device and fast operation in the device, without any stay of data, a large amount of registers or latches or first-in-first-out memories or the like for buffer storage of input-output communication data are required, in addition to the hardware necessary for realizing the information processing function.

SUMMARY OF THE INVENTION

Accordingly, a primary object of the present invention is to provide an information processor suitable for integration, which can reduce a memory capacity in the processor and make the structure simplified.

Briefly stated, there is provided a ring bus formed in a ring fashion for sequentially propagating data while storing the data. To the ring bus, output of at least one receiving and controlling means is connected through data jointing means, at least one transmitting and controlling means is connected through data branching means and at least one data processing means is connected through each of the data jointing means and data branching means.

Accordingly, in accordance with the present invention, it is possible to propagate the data from the receiving and controlling means or the data processed by the data processing means while storing the data, by using a ring bus, and it is also possible to provide such data to the data processing means or to the transmitting and controlling means. Therefore, there is no necessity to provide conventional queue memories in the receiving and controlling means, transmitting and control means and the data processing means, and hence memory capacity of the information processor can be largely reduced. In addition, the present invention can apply to all kinds of data processing means and hence the system architecture flexibility is extremely high so that the present invention can apply to a variety of applications.

In accordance with a preferred embodiment of the present invention, the ring bus is structured by an active line such as a first-in-first-out memory provided between the data jointing means and the data branching means, and transmission control means performs operations of data writing, shifting and reading to this active transmission line.

In accordance with the preferred embodiment of the present invention, since the ring bus is structured by an active transmission line such as a first-in-first-out memory and the active transmission line is controlled by the transmission control means such that the data writing, shifting and reading can be made, the receiving and controlling means, transmitting and controlling means and data processing means simply provide the data on the ring bus and do not require control for data transmission, which makes the structure simplified.

Furthermore, in accordance with a further preferred embodiment of the present invention, the data jointing means selectively provides to the active transmission line on its output side, either of the data from the data processing means corresponding to itself or the data from the receiving and controlling means and the data sent from the active transmission line on the input side. The data branching means selectively applies the data sent from the active transmission line on its input side to either of the data processing means corresponding to itself or the transmission and controlling means and the active transmission line on its output side.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram of an example of an active transmission line in a ring bus shown in FIG. 5;

FIG. 8 is a diagram showing a specific example of a transmission control unit for enabling and disabling a bus buffer driver shown in FIG. 7

FIG. 9 is a diagram showing a C element structuring transmission control unit in FIGS. 7 and 8;

FIG. 10 is a function table of the C element shown in FIG. 9;

FIG. 16 is a block diagram of the active transmission line shown in FIG. 11.

DESCRIPTION OF THE PREFERRED EMBODIMENTS

Figure 4:
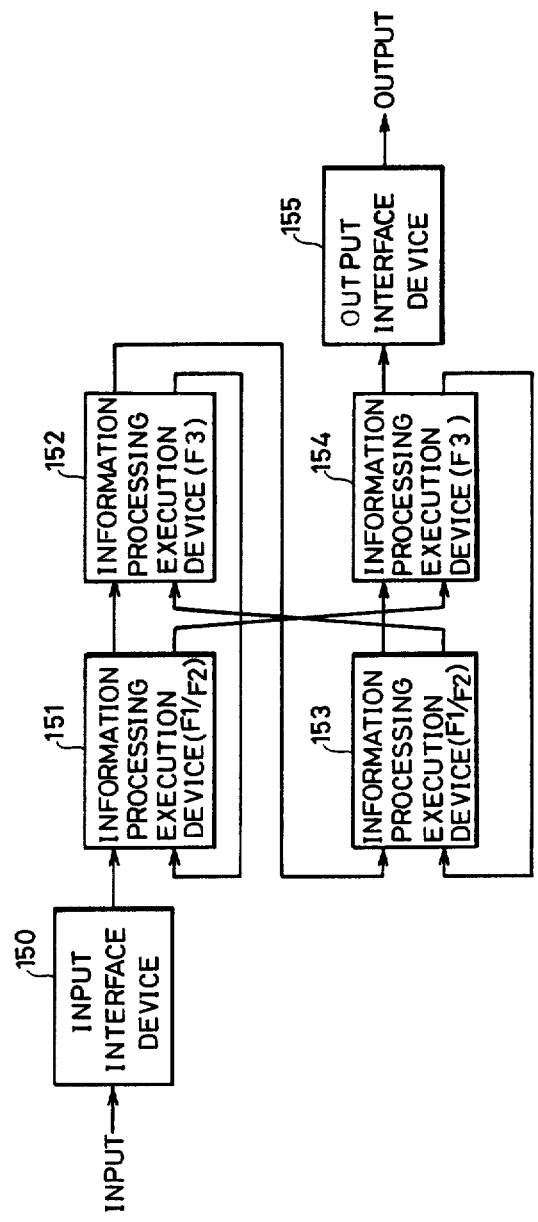
FIG. 4 is a schematic block diagram showing a whole structure of the information processor of one embodiment of the present invention.

FIG. 4 is a diagram showing a structure of a system utilizing one embodiment of the present invention. The system shown in FIG. 4 is adapted such that data applied to an input interface device 150 is processed by information processing execution devices 151, 152, 153 and 154 and the processed data is outputted from an output interface device 155. The reference numerals F1 through F3 shown in the information processing execution devices 151 through 154 symbolically represent inherent functions for each purpose essential to information processing. The information processing execution devices 151 and 153 represent decentralized processing of the functions F1 and F2 by a data processing unit in the respective devices and the devices 152 and 154 indicates that a single function F3 should be decentralized-processed.

More specifically, for example, the function F1 is an ALU (arithmetic logic unit), the function F2 is a program memory and the function F3 is a data memory.

Accordingly, the structure shown in FIG. 4 constitutes a multiprocessor system including a plurality of ALUs. Meanwhile, the information processing execution devices 151 and 153, and 152 and 154 may not have the same function and the information processing execution devices 152 and 154 constitute data memory, respectively in which the respective memory capacity is different from each other.

Figure 5:
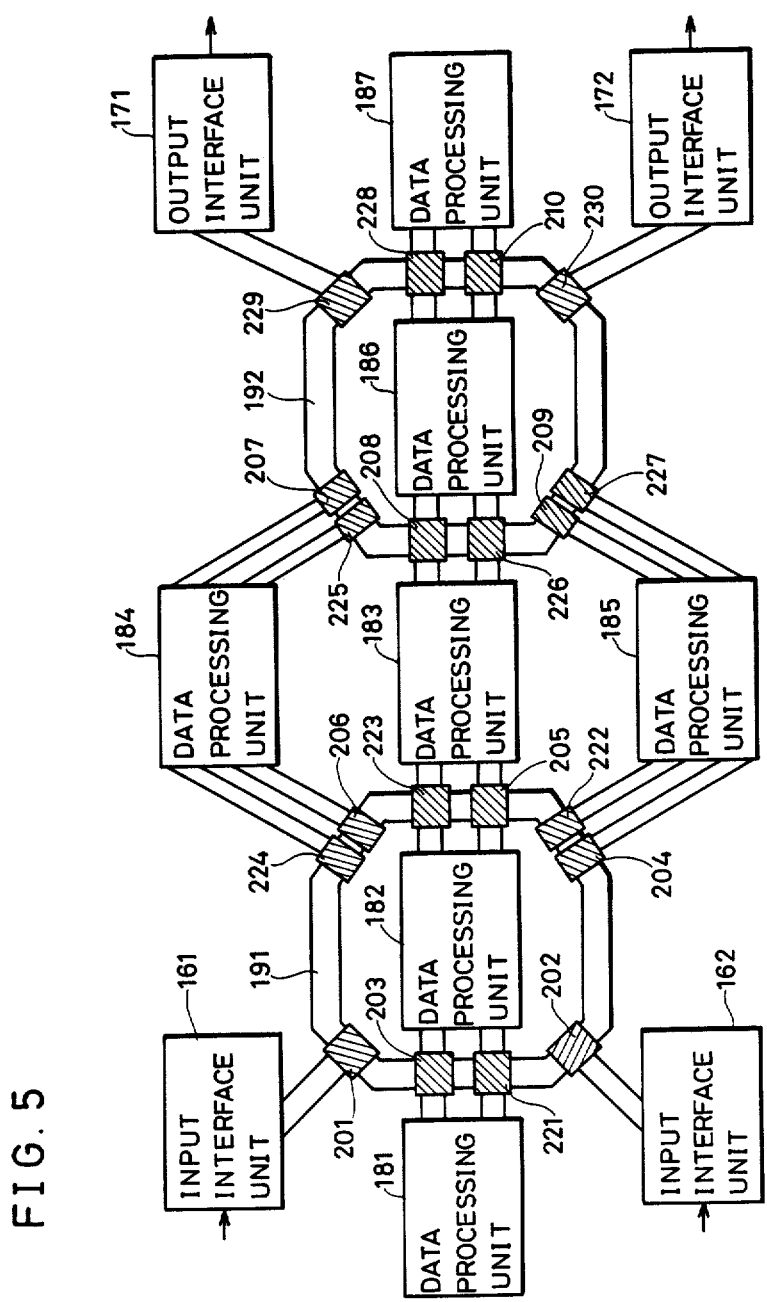
FIG. 5 is a diagram showing a structure of one example of an information processing execution element shown in FIG. 4.

FIG. 5 is a schematic block diagram showing an information processing execution device shown in FIG. 4.

First of all, referring to FIG. 5, the structure thereof will be described. Input interface units 161 and 162 as receiving and control means are connected to a ring-like active transmission line 191 through jointing mechanism 201 and 202, respectively. The ring-like active transmission line 191 automatically transmits data while storing the data. A plurality of data processing units 181, 182, 183, 184 and 185 are connected to the ring-like active transmission line 191 through jointing mechanism 203, 204, 205 and 206 and branching mechanism 221, 222, 223 and 224. The above described jointing mechanism 201 through 206 serve to merge data from each of the input interface units 161 and 162 and the data processing units 181 through 185 into the ring-like active transmission line 191 and the branching mechanism 221 through 224 serve to distribute, respectively, the data from the ring-like active transmission line 191 to the data processing units 181 through 185.

To the other ring-like active transmission line 192, output interface units 171 and 172 as transmitting and controlling means are connected through the branching mechanism 229 and 230, respectively. In addition, to the ring-like active transmission line 192, the data processing units 183 though 187 are connected through the jointing mechanism 207 through 210 and branching mechanism 225 through 228.

As the data processing units 181, 182, 186 and 187, program memories are specifically used and as the data processing units 183 through 185, ALUs for example, are used. Meanwhile, the data processing units 181 through 187 are not limited to such program memories or ALUs and hence any kinds of data processing units may be used.

Now, an operation will be described. A data packet inputted into the input interface 161 is applied to the ring-like active transmission line 191 through a jointing mechanism 201 and is processed by one of the data processing units 181 through 185, which corresponds to the destination of the packet, while circulating the ring-like active transmission line 191. As a result, the processed packet is sent out, as an output packet, from the output interface units 171 through another ring-like active transmission line 192 and a branching mechanism 230.

Figure 6:
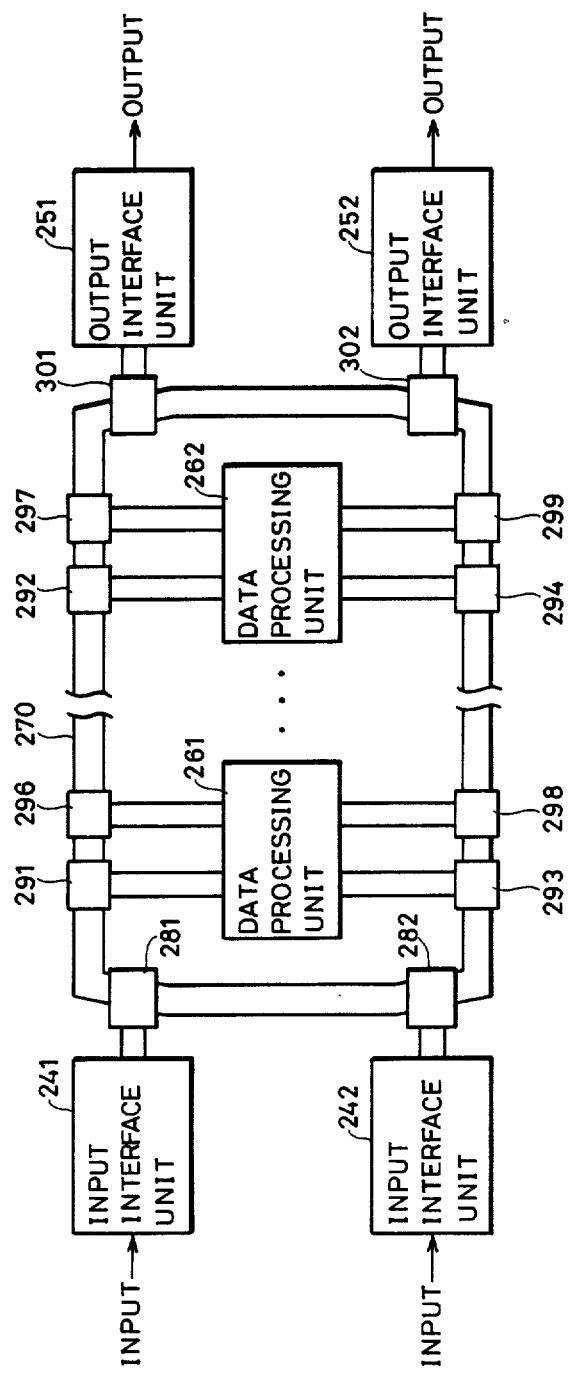
FIG. 6 is a diagram showing a structure of another example of the information processing execution element shown in FIG. 4.

FIG. 6 is a schematic block diagram showing another example of the information processing execution element shown in FIG. 4.

Now, referring to FIG. 6, the structure will be described. In the example shown in FIG. 6, input interface units 241 and 242 are connected to a ring-like active transmission line 270 through jointing mechanisms 281 and 282, respectively. In addition, output interface units 251 and 252 are connected to the ring-like active transmission line 270 through branching mechanisms 301 and 302. Data processing units 261 and 262 are connected to the ring-like active transmission line 270 through jointing mechanisms 291 through 294 and branching mechanisms 296 through 299.

With the information processing execution element as structured in the foregoing, unless a propagation delay time per stage of storage element in the ring-like active transmission line 270 is extremely small and the processing time in the data processing units 261 and 262 is relatively longer, the data circulating time on the ring-like active transmission line 270 becomes shorter than the minimum processing time of the data processing units 261 and 262 and hence it can be expected that efficiency for execution processing is enhanced.

FIG. 7 is a diagram showing an example of the ring-like bus as the active transmission line shown in FIGS. 5 and 6, FIG. 8 is a diagram showing a specific example of a transmission control unit for enabling and disabling the bus buffer drivers shown in FIG. 7, FIG. 9 is a diagram showing a C element structuring transmission control unit in FIGS. 7 and 8, and FIG. 10 is a diagram showing a function table of the C element.

First, referring to FIG. 7, the structure of the active transmission line will be described. The active transmission line is data lines 310 through 312. Bus buffer drivers 321 through 325, 331 through 335 and 341 through 345 are connected in cascade for each data line. Enabling and disabling of the bus buffer drivers 321, 331 and 341 corresponding to all of the bits in the first stage are controlled by a control line 350. Capacitances 361, 362 and 363 connected to output terminals of the respective bus buffer drivers 321 through 325, 331 through 335 and 341 through 345 represent the sum of load capacitances and wiring stray capacitances of the bus buffer drivers 322, 332 and 342 in the next stage on the same data line, which indicates that data can be stored in a dynamic manner for each stage.

A control line 391 serves to represent that data is held in a bus buffer driver at this stage to consider whether data transfer to the next stage is possible or not, depending on whether it is empty or full. Gates 371 through 375 serve to verify a logical value of an output control signal at that stage in accordance with a logical value of a control line which is an input signal from the last stage and a logical value of the next stage control line which is a feed-back input signal from the next stage. These gates are generally called C elements (Coincidence Element). Such a C element is well known and is described "A-synchronous Logics and Application to Information Processing" by D. E. Muller in page 289 in SWITCHING THEORY IN SPACE TECHNOLOGY (1963) published by STANFORD UNIV. PRESS.

The C element is represented by the symbols shown in FIG. 9 and the operation thereof is based on the function table shown in FIG. 10.

Now, an operation of the transmission control unit shown in FIG. 8 will be described in accordance with the function table of the C element shown in FIG. 10. In an initial state, if and when all of the outputs of the C elements 371 through 375 are logical "0" and a read signal 393 is also a logical "0", an output control signal 385 of the C element 375 is also a logical "0", which indicates that outputting is prohibited.

Similarly, the logical values appear at input and output terminals of the C elements 371 through 374, so that an input ready signal 392 represents that it is possible to receive an input. If and when data write signal 381 is rendered to be a logical "1", an output control signal 382 of the C element 371 changes its logical state to a logical "1" and thus input ready signal 392 becomes a logical "0" so that it is impossible to receive an input.

Since the input signals of the C element 372 both become logical "1", an output control signal 383 is a logical "1" and the control signal 391 is a logical "0". Such change in logical state is propagated to the C element 374 in the same manner. Furthermore, after an arbitrary time period which is longer than a delay time period of signal propagation for one stage of the C element, the logical state of the data write signal 381 is returned to a logical "0", and then, the output control signal 382 of the C element 371 is returned to a logical "0" and the information signal 391 is returned to a logical "1". Such change in the logical state is propagated to the C element 373 in the same manner.

Finally, the data of a logical "1" is written into and held in the C element 374 and forwarded to the C element 375. If and when a read signal line 393 changes to a logical "1", write data is transferred by a single stage, so that the output control signal 385 changes to a logical "1".

As seen from the above described operation, the output control signal 385 can be used for indicating the top stage of the buffer in which data is held and the data transfer is stopped at the last stage of the gate in which the signal 385 is a logical "1", so that the data can be held in the buffer driver 324 corresponding to the C element 375 in FIG. 7.

Figure 11:
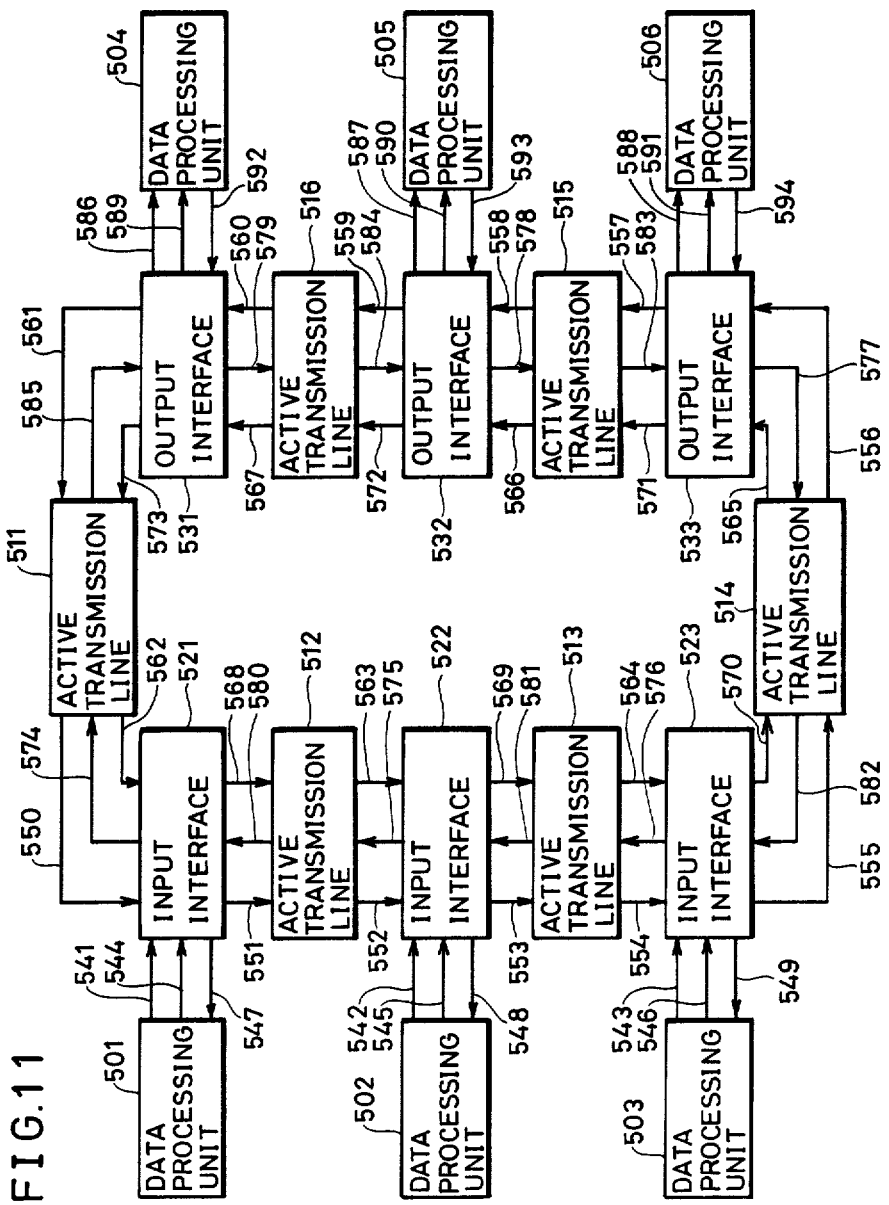
FIG. 11 is a block diagram showing another example of the ring data bus shown in FIG. 5.

FIG. 11 is a block diagram showing other embodiment of the present invention.

In the embodiment shown in FIG. 11, a ring bus is formed by connecting active transmission lines 511 through 516 which work as first-in-first-out memories respectively, input interfaces 521 through 523, as jointing means, provided between these active transmission lines 511 through 516, and output interfaces 531 through 533 as branching means. The ring bus comprises data lines 550 through 561, output ready signal lines 562 through 567, write signal lines 568 through 573, shift signal lines 574 through 579, and input ready signal lines 580 through 585.

Furthermore, data processing units 501, 502 and 503 are connected, respectively, to the input interfaces 521, 522 and 523 through data buses 541 through 543, output ready signal lines 544 through 546 and read signal lines 547 through 549. In addition, to the output interfaces 531 through 533, data processing units 504 through 506 are connected, respectively, through data buses 586 through 588, write signal lines 589 through 591 and input ready signal lines 592 through 594.

Now, an operation of the data transmission apparatus shown in FIG. 11 will be described. For example, let's consider the situation where data is transmitted from the data processing unit 502 to the data processing unit 504. The data processing unit 502 sends the data to be outputted, including address information corresponding to the data processing unit 504 which is the destination. The data outputted from the data processing unit 502 is applied to the ring bus through the input interface 522. The data as outputted continues to circulate in the ring bus for waiting, until the data processing unit 504 which is the destination comes to be in an enable state to receive data, at which time the data processing unit 504 receives the data through the output interface 531. The data in the ring bus does not require a spare control bit indicating whether the data field is an empty slot or not, which is required in the conventional one, and, therefore, the width of the data bit can be advantageously reduced as compared with the conventional example.

Figure 12:
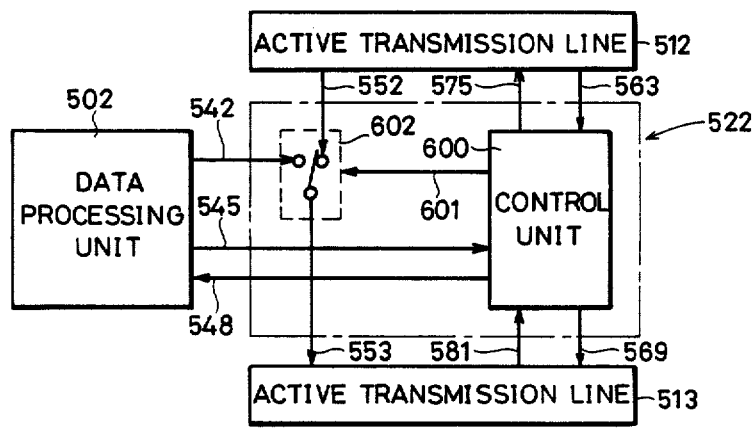
FIG. 12 is a block diagram of the input interface shown in FIG. 11.
Figure 13:
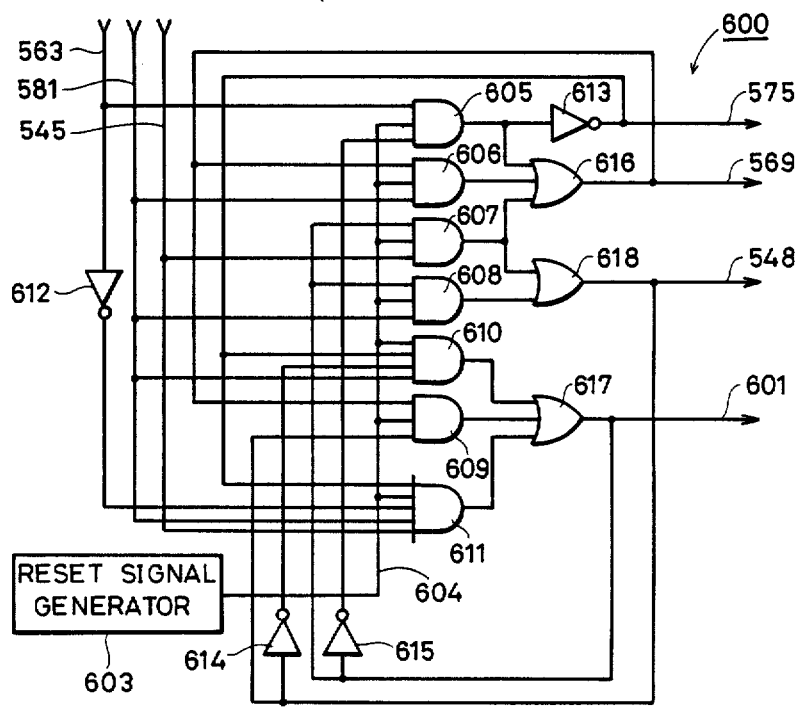
FIG. 13 is a circuit diagram of a control unit shown in FIG. 12.

FIG. 12 is a block diagram of the input interface shown in FIG. 11 and FIG. 13 is a circuit diagram of the control unit 600 shown in FIG. 12.

Referring to FIG. 12, by way of an example, the input interface 522 shown in FIG. 11 will be described. The input interface 522 comprises a control unit 600 and a data switching portion 602. The control unit 600 is responsive to a logical "1" of the output ready signal line 563 connected to the active transmission line 512 on an input side to verify that the data is applied on the data line 552. If and when the control unit 600 verifies that the data is applied on the data line 552, it renders the switching signal 601 applied to the data switching portion 602 to be a logical "0". As a result, the data applied to the data line 552 is bypassed on the data line 553. The control unit 600 waits until the active transmission line 513 makes the input ready signal line 581 a logical "1", and then the control unit 600 makes the write signal line 569 a logical "1", so that said data is applied to the active transmission line 513 on the output side. Therefore, the control unit 600 makes the shift signal line 575 a logical "1" and the data on the data line 552 is shifted so that new data appears. This simple operation is repeated.

If and when the data is ready to be outputted, the data processing unit 502 makes the output ready signal line 545 be a logical "1". If and when the data processing unit 502 makes the output ready signal line 545 be a logical "1", the control unit 600 temporarily stops the execution of the above described repeated operation at the timing of the pause cycle of the above described operations and makes the switching signal 601 be a logical "1". Then, the control unit 600 makes the read signal line 548 be a logical "1", so that the data is read out from the data processing unit 502 on the data bus 542 and the data as read out is bypassed on the data line 553. Then, the control unit 600 waits until the active transmission line 513 renders the input ready signal line 581 to be a logical "1", and then renders the write signal line 569 to be a logical "1", so that said data can be transmitted to the active transmission line 513. Therefore, the control unit 600 reinitiates the above described repeated operation which was interrupted.

Meanwhile, as shown in FIG. 13, the control unit 600 comprises a reset signal generator 603, AND gates 605 through 611, inverters 612 through 615 and OR gates 616 through 618. The reset signal generator 603 generates a reset signal so that the whole ring data bus can be initialized. The reset signal 604 is set such that it is a low level only in an initial state and is a high level in other situation. In addition, only one reset signal generator 603 may be provided in a whole ring or a reset signal generator may be provided for each input interface. In addition, although the control unit 600 is structured as a synchronous sequential circuit in FIG. 13, it may be structured as an asynchronous sequential circuit.

As described in the foregoing, the input interface 522 comprises only the control unit 600 and the data switching portion 602. Other input interfaces 501 and 503 are also structured in the same manner. Thus, according to the above described embodiment, there is an advantage in that there is no need to reset a control bit indicating whether there is an empty slot, which is required in the conventional input interfaces 40, 41 and 42, and in that the portion 106 for monitoring the control bit of the data field being applied and the latch 105 are not required. Thus, the input interfaces 501 through 503 are structured in a simplified manner and the operation thereof is simplified, as described in the foregoing.

Figure 14:
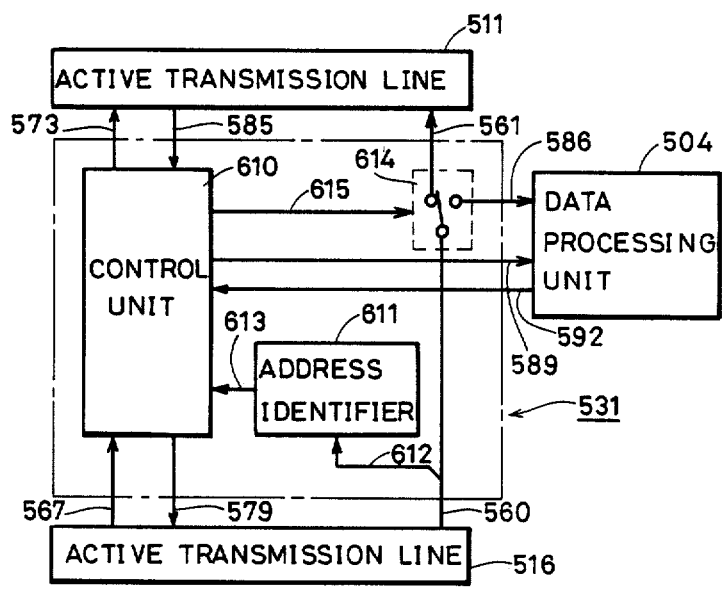
FIG. 14 is a block diagram of the output interface shown in FIG. 11.
Figure 15:
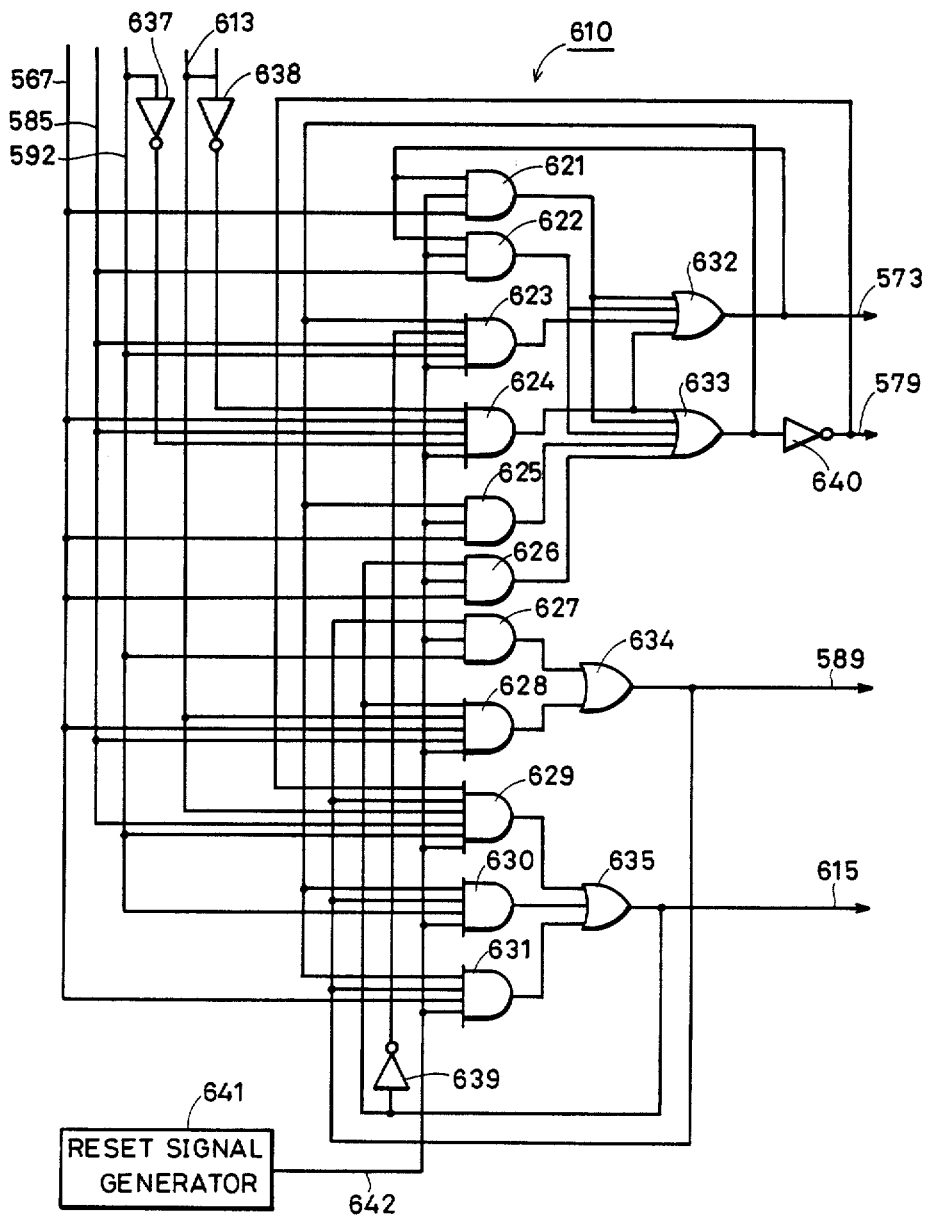
FIG. 15 is a circuit diagram of the control unit shown in FIG. 14.

FIG. 14 is a block diagram of the output interface shown in FIG. 11 and FIG. 15 is a circuit diagram of the control unit shown in FIG. 14.

Now, referring to FIG. 14, the output interface 531 will be described by way of example. The output interface 531 comprises a control unit 610, an address identifier 611 and a data switching portion 614. The control unit 610 is responsive to a logical "1" of the output ready signal line 567 connected to the active transmission line 516 on the input side to verify that the data is outputted on the data line 560. If and when the control unit 610 verifies that the data is outputted from the active transmission line 516, the switching signal 615 is rendered to be a logical "0" to be applied to the data switching portion 614. The data switching portion 614 puts on the data line 561 the data applied on the data line 560 of the active transmission line 516 on the input side. Then, the control unit 610 waits until the active transmission line 511 on the output side renders the input ready signal line 585 to be a logical "1", the control unit 610 renders the write signal line 573 to be a logical "1" is that said data is sent out to the active transmission line 511. Thereafter, the control unit 610 renders the shift signal line 579 to be a logical "1", so that the data on the data line 560 is shifted so that new data appears. Such operation is repeated.

When the control unit 610 verifies that the input ready signal line 592 becomes logical "1", that is, if and when the data processing unit 504 is in an enable state to receive data, the address identifier 611 is responsive to the address information 612 contained in the data outputted on the data line 560 to examine whether the address represents the data processing unit 504 or not. If and when the address information 612 corresponds to the data processing unit 504, the address identifier 611 makes the address identification result signal 613 be a logical "1".

If and when the address identification result signal 613 becomes a logical "1", the control unit 610 renders the switching signal 615 to be a logical "1" to switch the data switching portion 614. Accordingly, the data applied on the data line 560 from the active transmission line 516 on the input side is transmitted on the data bus 586 through the data switching portion 614, so that the data is applied to the data processing unit 504. At that time, the control unit 610 renders the write signal line 589 to be a logical "1" so that the data is received in the data processing unit 504. Thereafter, the control unit 610 makes the shift signal line 579 be a logical "1", so that the data applied to the data line 560 is shifted so that new data appears.

If and when the address identification result signal 613 is a logical "0", that is, if and when the address does not indicate the data processing unit 504, the switching signal 615 is rendered to be a logical "0", so that the data applied on the data line 560 is put on the data line 561 by the data switching portion 614.

Thereafter, the control unit 610 waits until the active transmission line 510 makes the input ready signal line 585 be a logical "1", and then, the write signal line 573 is rendered to be a logical "1" so that the data applied on the data line 561 is sent out to the active transmission line 511. Thereafter, the control unit 610 renders the shift signal line 579 to be a logical "1", so that the data applied on the data line 560 is shifted so that new data appears. Subsequently, the above described repeated operation is initiated.

Meanwhile, as shown in FIG. 15, the control unit 610 comprises AND gates 621 through 631, OR gates 632 through 635, inverters 637 through 640, and a reset signal generator 641. The reset signal generator 641 has the same structure as the reset signal generator 603 shown in FIG. 13. A single reset signal generator 641 may be adapted to provide a reset signal to the whole ring data bus. In addition, although the control unit 610 is structured as an asynchronous sequential circuit, it may be also structured as a synchronous sequential circuit.

Furthermore, the address identifier 611 shown in FIG. 14 may be structured as a decoder which makes the address identification result signal 613 be a logical "1" only if the address information 612 corresponds to the data processing unit 504, and makes the signal 613 to be a logical "0" in other situations. As such a decoder, a logic circuit or read only memory (ROM) or the like can be used.

Meanwhile, output interfaces 532 and 533 other than the output interface 531 shown in FIG. 14 are structured in the same manner. Since the output interfaces 531 through 533 are structured as described in the foregoing, the mechanism for monitoring a control bit indicating whether the data field is the empty slot or not, which was required in the conventional output interfaces 70 through 72 and the mechanism for making the control bit be a logical "1" can be eliminated and the latch 125 can be also eliminated.

FIG. 16 is a block diagram of the active transmission line 511 shown in FIG. 11.

The active transmission line 511 shown in FIG. 11 serves to receive the data outputted at any time from the output interface 531 and to propagate to the input interface 521 the received data, with the order as received being maintained. The input interface 521 receives the data in accordance with said order and if the input interface 521 can not receive the data, the data group is stored temporarily in the active transmission line 511 with said order being held until the interface 521 can receive the data. All other active transmission lines serve the same function.

Referring to FIG. 16, the active transmission line 511 will be described in detail by way of example. The active transmission line 511 comprises registers 650 through 652. The number of these registers corresponds to the number of the data that the active transmission line 511 is able to store, that is, the number of stages of a first-in-first-out memory. These registers 650 through 652 are connected in cascade through the data lines 653, 654 and 655. An input data line 561 is connected to a register 650 on the input side and the output data line 550 is connected to the register 652. The data lines 653 through 655, 561 and 550 may have, respectively, 5 bits, for example, or 32 bits.

In order to control the above described registers 650 through 652, there are provided an input control unit 656, register control units 657 through 659 and an output control unit 660. A write signal is applied to the input control unit 656 from the output interface 531 through the write signal line 573, and an input ready signal is applied to the output interface 531 from the input control unit 656 through the input ready signal line 585. In addition, an output ready signal is applied to the input interface 521 from the output control unit 660 through the output ready signal line 562 and a shift signal is applied to the output control unit 660 from the input interface 521 via the shift signal line 574.

The input ready signal line 585 is always a logical "1", except for the time when the data is stored in the active transmission line 511 by the number of its stages and the time when the data is being written into the active transmission line 511. Only if the input ready signal line 585 is a logical "1" does a writing operation through a write signal line 573 becomes effective. More particularly, if and when the write signal line 573 is a logical "1" and the input ready signal line 585 is a logical "1", a register write signal 661 is generated from the register control unit 657 and is applied to the register 650. Then, the data appearing on the data line 561 is written into the register 650 and the input ready signal line 585 outputted from the input control unit 656 is temporarily rendered to be a logical "0".

Subsequently, a write signal 662 from the register control unit 658 is applied to the register 651. Correspondingly, the data written into the register 650 appears on the data line 653 and is written into the register 651. At this point, the above described input ready signal line 585 becomes logical "1" again. Furthermore, writing data into the later stage register is effected, so that the data inputted from the data line 561 propagates toward the register 652 on the output side.

For example, in an initial state where no data is stored in the active transmission line 511, when a write signal in a logical "1" is generated in the write signal line 573 at a time, that is, when only one set of data is inputted, the data sequentially propagates to the registers 650 and 651 and finally is written into the register 652. Then, the output control unit 660 renders the output ready signal line 562 to be a logical "1". If and when another set of data is applied to the data line 561, the propagation of the data is made such that the propagation is stopped when the data is written into the register immediately preceding the register 652.

Thus, the data corresponding to the number of stages of the registers contained in the active transmission line 511 can be stored with the applied order and such data can be read out in accordance with the above described order. For example, if the shift signal line 574 is rendered to be a logical "1" in the above described situation, said first set of data stored in the register 652, that is, the data applied to the data line 550 is handled as null and, the output control unit 660 makes the output ready signal line 562 be a logical "0", so that the content in the register immediately preceding to the register 652 is written into the register 652 in reverse order of the above described data writing, and the output ready signal line 562 is again rendered to be a logical "1".

More particularly, the content in the register is shifted to the right direction by one. At that time, it should be noted that the contents in said second set of data is applied on the data line 550. If the shift signal line 574 is rendered to be a logical "1" with such state, said second set of data stored in the register 652 is handled as null. As a result, the data which was stored in the active transmission line 511 is exhausted, and hence, the output ready signal line 562 becomes in a state where it is a logical "0", until a new data set is applied.

Figure 1:
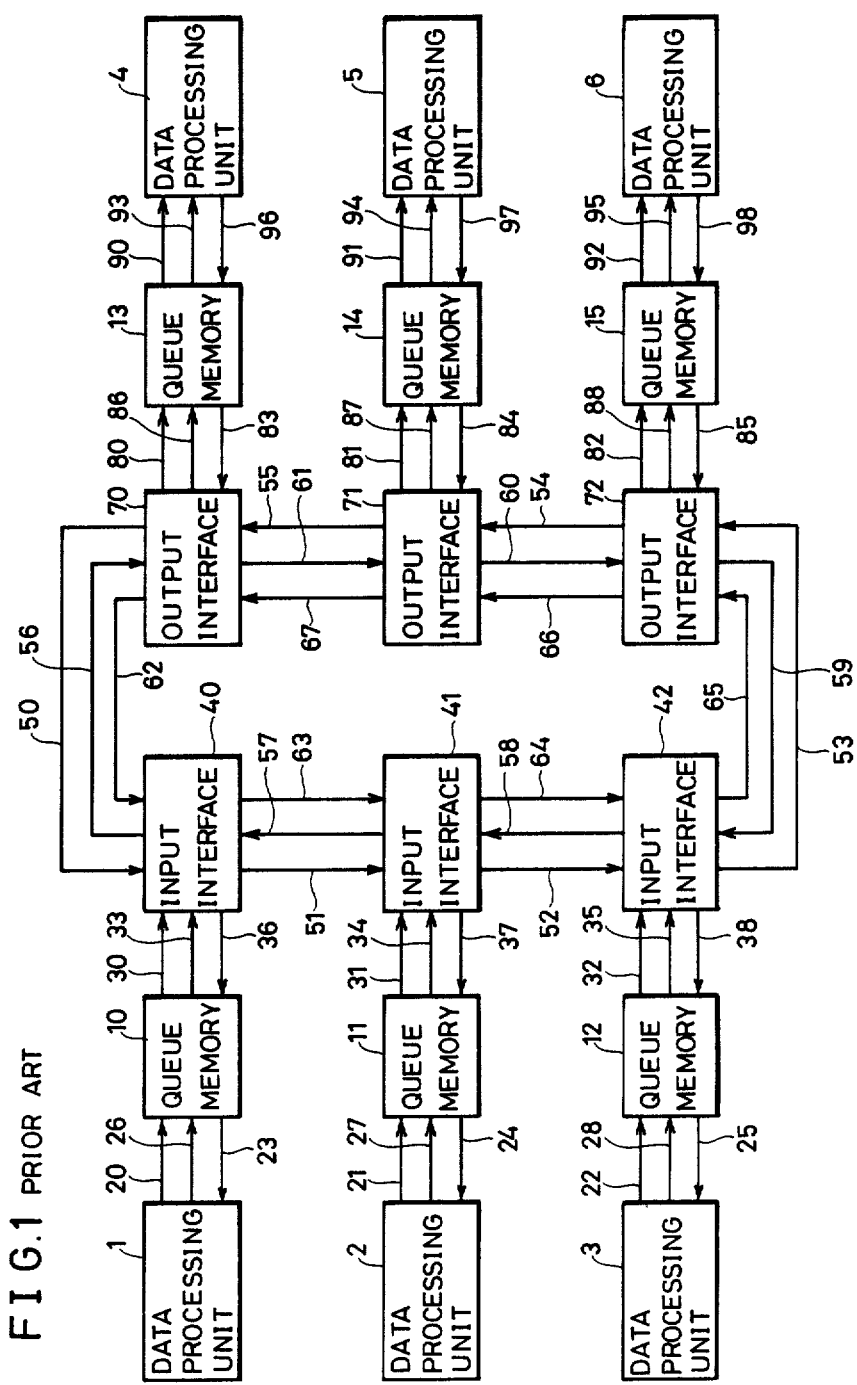
FIG. 1 is a schematic block diagram showing an information processor using a conventional ring data bus.
Figure 2:
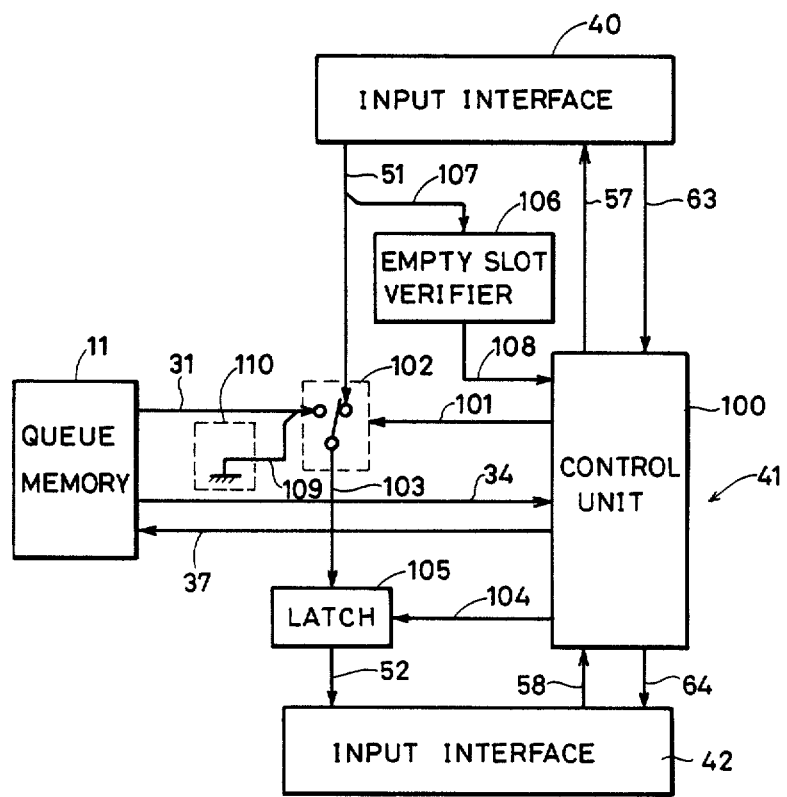
FIG. 2 is a detailed block diagram of the input interface shown in FIG. 1.
Figure 3:
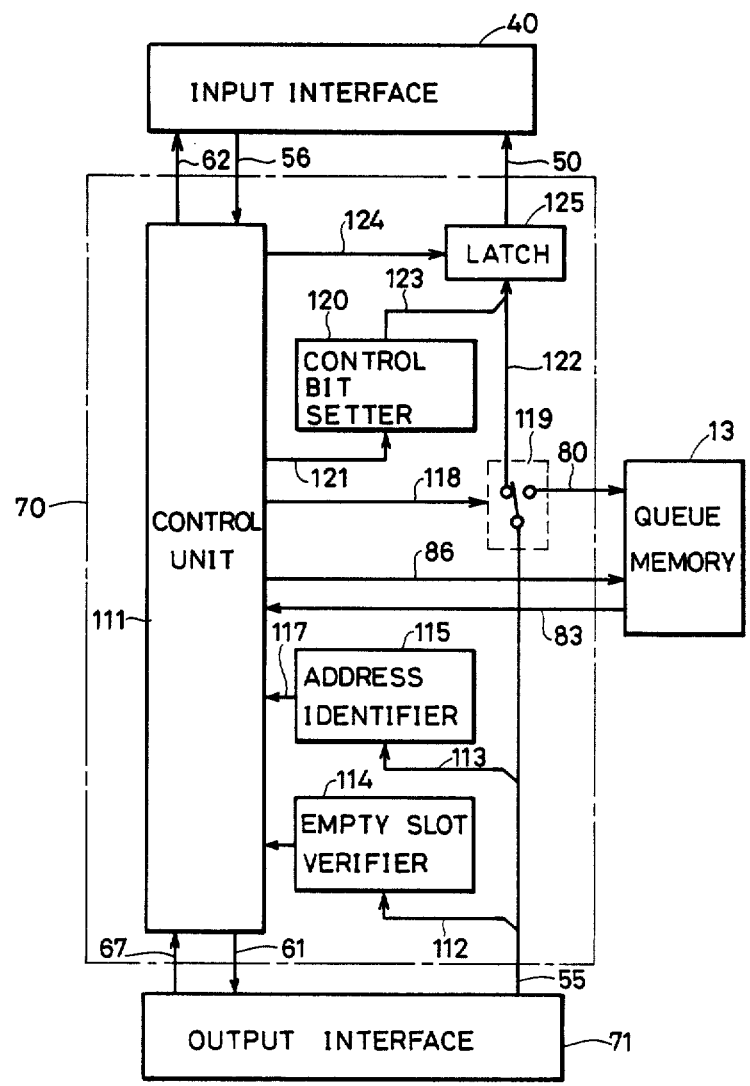
FIG. 3 is a detailed block diagram showing the output interface shown in FIG. 1.

As described in the foregoing, since the active transmission lines 511 through 516 have not only a function as a transmission line, but also a function as a queue memory for queuing, a closed circuit in which these active transmission lines 511 through 516 are coupled in a ring fashion can enhance use efficiency of use because a plurality of queue memories shown in FIG. 1 can be centralized and shared with each other without being physically and functionally decentralized. More particularly, there is an advantage that a total memory capacity can be remarkably reduced for a whole data transmission apparatus using a ring data bus.

As the above described active transmission lines 511 through 516, a first-in-first-out memory (SN74S225; produced by Texas Instrument Inc.), for example, can be used. In addition, a technique of manufacturing the first-in-first-out memory has been already established. Accordingly, if and when a system such as a multiprocessor system, including a data transmission apparatus using a ring data bus is structured as an integrated circuit, as can be readily determined from FIGS. 11 and 16, the system can be implemented simply by arraying simple repetition elements of silicon devices. The system can be easily achieved by directly connecting between the group of silicon devices, respectively, corresponding to the respective input interfaces 521 through 523, to output interfaces 531 through 533 and to the active transmission lines 511 through 516 shown in FIG. 11. This does not require a large capacity such as a queue memory shown in FIG. 1, that is, the active transmission lines 511 through 516 shown in FIG. 11 require a smaller number of stages than that in said queue memory, and hence an array of the silicon devices becomes physically small. Accordingly, the above described embodiment has an advantage that it is suitable for implementation as an integrated circuit. In addition, the train of the input control unit 656, the register control units 657 through 659, and the output control unit 660 can be the structure as shown in FIG. 8.

Meanwhile, the embodiment shown in FIG. 11 discloses the data transmission apparatus in which the data is transmitted in a ring fashion, and includes, as a control signal, address information corresponding to the data processing unit which is a destination. However, it should be understood that another information processor using data transmission apparatus should be included in an embodiment of the present invention.

More particularly, according to other different data transmission apparatus, a destination of the data is not identified at the time when the data is sent out, and the data, which does not include address information, is sent out to a ring-like active transmission line. If, at the time when the data reaches any of the output interfaces while the data is circulating in the ring-like active transmission line, the data processing unit corresponding to the output interface that the data reached is in an enable state to receive data, the data is sent to the data processing unit. If such a data processing unit is not in an enable state to receive data, another type of data transmission apparatus can be applied in which the data is made to continue to circulate in the ring-like active transmission line. In such a case, in the output interface, the control signal determining the destination of the data is an input ready signal line 586, 587 or 588 shown in FIG. 11. Accordingly, the block diagram showing such embodiment is the same as that in FIG. 11 and the input interfaces 521 through 523 shown in FIG. 12 can be structured in the same manner. However, in the output interfaces 531 through 533 shown in FIG. 14, the address identifier 611, the address information 612 and address identification result signal 613 can be eliminated.

Although, in the embodiment shown in FIG. 11, each of the interfaces has either an input interface function or an output interface function, or each of the interfaces may have both input interface and output interface functions. For example, if the digital data processor, as an example of a data processing unit, is connected to each of a plurality of interfaces having both input interface and output interface functions, a multiprocessor system which can freely communicate between each processor and which is of a high performance can be easily structured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processor for receiving input data, for outputting output data, and capable of data transfer among a plurality of digital data processing units, comprising:
   at least one receiving and controlling means for receiving and controlling the input data;
   at least one transmitting and controlling means for controlling and transmitting the output data;
   at least one data processing means, for processing the input data received by said at least one receiving and controlling means and for providing the output data for transmission by said at least one transmitting and controlling means;
   an active transmission line including:
      a plurality of data holding means for storing and outputting data, including the input data and the output data, in inputted order, said plural data holding means coupled together in a ring; and
      transmission control means, coupled to said plurality of data holding means, for controlling the output of the data stored in said plural data holding means, so that when a latter one of said data holding means is empty, data stored in a preceding one of said data holding means is read out and applied to the latter one of said data holding means, said transmission control means including a plurality of transmission controlling means, respectively coupled to said plurality of data holding means, each of said plurality of transmission controlling means for controlling the output of data stored in the corresponding one of said plural data holding means so as to control the transfer of the data stored in the corresponding one of said plural data holding means to an adjacent one of said plural data holding means through use of a hand-shake procedure in which a preceding one of said transmission controlling means corresponding to a preceding one of said data holding means which is holding data, provides a first signal to a latter one of said transmission controlling means corresponding to a latter one of said data holding means, the first signal indicating that the data held by the preceding one of said data holding means is to be transmitted to the latter one of said data holding means, the latter one of said transmission controlling means returning a second signal indicating that the latter one of said data holding means is empty, the preceding one of said transmission controlling means being responsive to the second signal for transmitting the data stored in the preceding one of said data holding means to the latter one of said data holding means and providing a third signal indicating that the preceding one of said data holding means is empty;

a plurality of data jointing means, coupled between respective predetermined ones of said data holding means in said active transmission line and respectively coupled to said at least one receiving and controlling means and said at least one data processing means, for jointing said at least one receiving and controlling means and said at least one data processing means, respectively, to said active transmission line, a first of said plurality of data jointing means having an input terminal, coupled to said at least one receiving and controlling means, for jointing the input data from said at least one receiving and controlling means to said active transmission line, a second of said plurality of data jointing means including an input terminal, coupled to said at least one data processing means, for jointing the output data from said at least one data processing means to said active transmission line;

a plurality of data branching means, coupled between respective predetermined ones of said plurality of data holding means in said active transmission line, and respectively coupled to said at least one transmitting and controlling means and said at least one data processing means, for branching the data transmitted on said active transmission line to said at least one transmitting and controlling means and said at least one data processing means, respectively, a first of said plurality of data branching means having an output terminal for branching the output data from said active transmission line to said at least one transmitting and controlling means, a second one of said plurality of data branching means having an output terminal for branching the input data from said active transmission line to said at least one data processing means.

2. An information processor in accordance with claim 1, further comprising means for providing a write signal, an input ready signal and a shift signal, wherein:

said active transmission line is coupled to said means for providing a write signal, an input ready signal and a shift signal, and further includes:

data lines coupled between said jointing means, said data branching means and said data holding means; and input ready signal lines, output ready signal lines, write signal lines and shift signal lines coupled between said data jointing means, said data branching means and said transmission control means, and said transmission control means causes the data being applied on said active transmission line to be stored in one of said plurality of data holding means when the write signal is transmitted to said write signal line while the input ready signal is outputted to said input ready signal line, said transmission control means being responsive to outputting of the shift signal to said shift signal line to cause the data stored in said plurality of data holding means to be sequentially read out.

3. An information processor in accordance with claim 1, wherein:

each of said plural data jointing means includes input selecting means for selecting one of the data processed by said at least one data processing means and the data read out from one of said data holding means on its input side, or selecting one of the data outputted from said at least one receiving and controlling means and the data read out from one of said data holding means on its input side, and for providing the selected data to one of said data holding means on its output side, and each of said plural data branching means includes output selecting means for selecting one of said at least one data processing means and the one of said data holding means on its output side, and selecting one of said at least one transmitting and controlling means and the one of said data holding means on its output side, and for providing to the selected means the data read out from said data holding means on the input side.

4. An information processor for receiving input data, for outputting output data, and capable of data transfer among a plurality of digital data processing units, comprising:

an input interface unit for receiving and controlling the input data;

active transmission means, coupled to said input interface unit, for transmitting and storing the input data, the output data and processed data;

an output interface unit, coupled to said active transmission means, for controlling and transmitting the output data;

a first data processing unit, coupled to said active transmission means, for processing the input data transmitted on said active transmission means and for providing processed data on said active transmission means;

a second data processing unit, coupled to said active transmission means, for processing the processed data provided on said active transmission means and for providing the output data on said active transmission means for output by said output interface unit;

plural data jointing means for connecting said input interface unit and said first and second data processing units to said active transmission means and for transmitting the input data or the processed data to said active transmission means from said input interface unit or said first or second data processing units, a first of said plural data jointing means having an input terminal for jointing the input data from said input interface unit to said active transmission means, a second of said plural data jointing means having an input terminal for jointing the processed data from said first or second data processing units to said active transmission means; and plural data branching means for connecting said output interface unit and said first and second data processing units to said active transmission means, and for transmitting the input data, the processed data or the output data from said active transmission means to said output interface unit or said first or second data processing units, a first of said plural data branching means having an output terminal for branching the output data from said active transmission means to said output interface unit, a second of said plural data branching means having an output terminal for branching data from said active transmission means to one of said first and second processing units, said active transmission means including:

a plurality of data holding means arranged in a ring, with said plural data jointing means and said plural data branching means being respectively connected between selected ones of said data holding means; and transmission control means, coupled to said plurality of data holding means, for controlling the transmission of the input data or the processed data from one of said data holding means to another of said data holding means and for controlling the transmission of data from one of said data jointing means, or for controlling the transmission of the input data, the processed data or the output data to one of said data branching means, said transmission control means including a plurality of transmission controlling means, respectively coupled to said plurality of data holding means, each of said plurality of transmission controlling means for controlling the transmission of the input data or processed data from the corresponding one of said data holding means to an adjacent one of said data holding means by using a hand-shake procedure in which a current one of said transmission controlling means corresponding to a current one of said data holding means which is holding data, provides a first signal to an adjacent one of said transmission controlling means corresponding to an adjacent one of said data holding means, the first signal indicating that the data held by the current one of said data holding means is to be transmitted to the adjacent one of said data holding means, the adjacent one of said transmission controlling means returning a second signal indicating that the adjacent one of said data holding means is empty, the current one of said transmission controlling means being responsive to the second signal for transmitting the data stored in the current one of said data holding means to the adjacent one of said data holding means and providing a third signal indicating that the current one of said data holding means is empty.

* * * * *